2,946,772
WATER-SOLUBLE COPOLYMERS OF RING-SUBSTITUTED N-VINYL-2-OXAZOLIDINONE

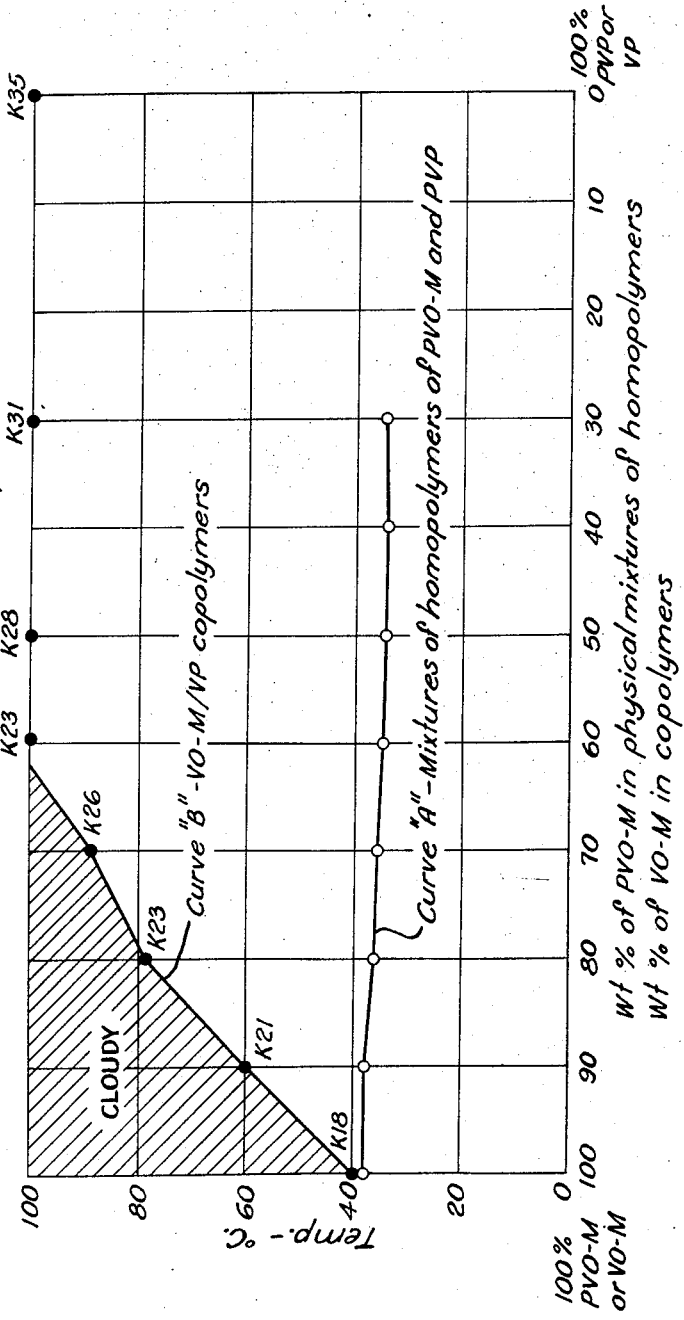

Wilhelm E. Walles and William F. Tousignant, Midland, Mich., assignors to The Dow Chemical Company, Midland, Mich., a corporation of Delaware Filed Feb. 27, 1958, Ser. No. 718,052

6 Claims. (Cl. 260—77.5)

The present invention resides in the general field of organic chemistry and is more particularly pertinent to the polymer art. It has specific reference to certain water-soluble copolymers of N-vinyl-5-methyl-2-oxazolidinone (hereinafter referred to as VO—M) with various N-vinyl cyclic amides including in particular, certain of the N-vinyl lactams and N-vinyl-3-morpholinones and certain other closely related N-heterocyclic vinyl monomers.

Poly-N-vinyl-5-methyl-2-oxazolidinone (PVO—M) is a water-soluble polymer of recent origin having many highly advantageous and remarkable properties. By way of illustration, PVO—M has unusual capacity for and the pronounced capability of attracting and accepting many of a wide variety of dyestuffs, including vat, acid, acetate, direct, napthol and sulfur dyes. This property makes the polymer significantly attractive as a dye-assisting adjuvant for many synthetic textile fibers that are normally difficult, if not impossible, to dye and in which the PVO—M may be incorporated. It may also be utilized with benefit as a dye-stripping agent for various textile materials and, amongst many other applications, may be employed with advantage in hair-setting compositions.

While PVO—M is a water-soluble, resinous material, its solubility in aqueous media is not general or entirely unrestricted. Thus, although PVO—M in broad molecular weight ranges up to about 100,000 to 200,000 or so is quite soluble in water at normal room temperatures, the polymer is afflicted with the phenomenon of inverse solubility in water with increasing temperature. If a clear solution of PVO—M in water is heated, it becomes cloudy at temperatures in the neighborhood of 40° C., depending upon the particular molecular weight range of polymer under observation. Accordingly, the cloud point in aqueous solution of PVO—M having a Fikentscher K-value greater than about 30 is usually about 35° C. Lower K-value polymers, such as those with K-values of, say, 12 or 16, have cloud points in water of about 43° C. or so. At temperatures that are about 10 centigrade degrees higher than the cloud point of the PVO—M in aqueous solution, the polymer generally separates from the solvent vehicle in the form of a sticky, frequently difficult-to-handle mass. Besides its features as a solute in water, PVO—M is generally not soluble in such lower alkyl alcohols as methanol, ethanol, etc.

For many applications, the indicated characteristics are not of material consequence. In certain instances, however, they may be of decided disadvantage. Thus, one of the attractive utilities of PVO—M is as a dye-receptor for acrylonitrile polymer compositions. One highly advantageous technique for providing such compositions, particularly when polyacrylonitrile based fiber products are involved, is to apply or impregnate the PVO—M from an aqueous solution of relatively low polymer solids content to a shaped acrylonitrile polymer article that is in an aquagel condition. Thus, an acrylonitrile polymer filamentary article that, pursuant to a well known procedure, has been spun from an aqueous saline spinning solution may be conveniently passed, after its coagulation and while it is still in an aquagel or highly hydrated condition, through an aqueous bath containing the dissolved PVO—M in order to impregnate the filament with the dye-assisting polymer adjuvant. It is sometimes desirable in such an operation to employ a hot impregnating bath. However, as is evident, such condition causes precipitation of the polymer due to its inverse solubility characteristics. This may tend to complicate the impregnating operation.

Likewise, in dye-stripping processes, better results are oftentimes achieved when a hot or boiling aqueous treating bath is employed. In addition, hair-setting formulations are oftentimes deemed to be of greater advantage and more widespread utility when constituted with an alcoholic rather than essentially water vehicle.

It would be an advantage, and it is the chief aim and concern of the present invention, to provide VO—M polymers having dye-receiving and other properties and characteristics commensurate with those of PVO—M while having a greater and more extended range of water-solubility, even under conditions of considerably higher temperature, as well as good solubility in alcoholic media. The inherent benefit of such more completely soluble polymeric compositions for use in alcohol or hot aqueous solutions or both, is manifest from the foregoing description and is further evident in the ensuing specification.

According to the present invention, a more thoroughly water-soluble VO—M polymer composition that is not materially afflicted or hampered by inverse solubility and low cloud point effects in aqueous solution is comprised of a copolymer of the general structure:

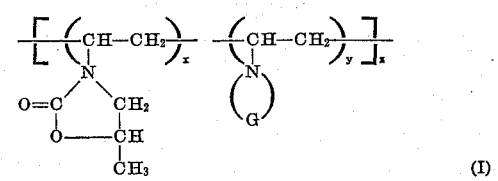

(I)

wherein G is a nitrogen attached, bivalent cyclizing group of the formulae:

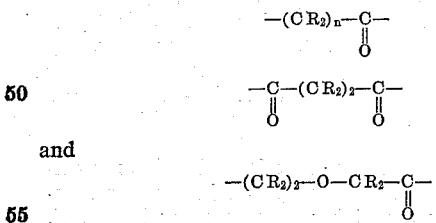

and in which R is hydrogen, methyl or ethyl and $n$ is an integer from 3 to 5; $z$ is equal to the sum of $x$ plus $y$ and the value of either $x$ or $y$ (or their relative proportion) is such that at least 1 weight percent of the copolymer consists of the polymerized VO—M monomer. Thus, as is apparent, the comonomers may be an N-vinyl-2-pyrrolidone, an N-vinyl-2-piperidone (including valerolactams), an N-vinyl-2-caprolactam, an N-vinylsuccinimide, an N-vinyl-3-morpholinone, or mixtures thereof.

Most advantageously, the comonomers employed are those which are not alkyl ring substituted, i.e., in which all of the R substituents in the above-indicated G groups are hydrogen. Thus, the comonomers are selected from at least one member of the group consisting of N-vinyl-2-pyrrolidone (also known as N-vinyl-2-pyrrolidinone), N - vinyl - 2 - piperidone, N - vinyl - 2 - caprolactam, N-vinyl-succinimide and N-vinyl-3-morpholinone which, respectively, are of the structures:

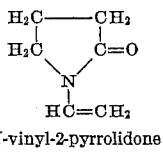
N-vinyl-2-pyrrolidone (II)

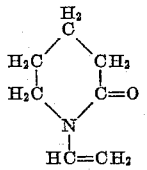
N-vinyl-2-piperidone (III)

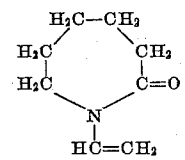
N-vinyl-2-caprolactam (IV)

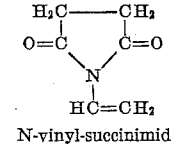
N-vinyl-succinimide (V)

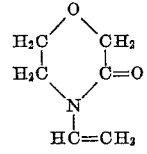
N-vinyl-3-morpholinone (VI)

As has been indicated, the copolymers of the present invention may contain from about 1 to 99 weight percent of VO—M in the polymer molecule. As little as 1 percent or so of one of the indicated comonomers with VO—M has a marked beneficial effect on the cloud point of the copolymer product. More pronounced effects are noted when the VO—M content is between about 10 and 90 weight percent. Advantageously, however, the VO—M content of the copolymer is at least about 40 weight percent and, with even greater benefit for many purposes, may be between about 60 and 80 weight percent, based on the total weight of the copolymer. In many instances it may be most desirable to copolymerize N-vinyl-2-pyrrolidone (VP) with the VO—M in order to obtain the beneficial copolymeric products of the present invention.

The copolymers of the present invention have excellent water-solubility with cloud points in aqueous solution that generally are higher than those of PVO—M. Aqueous solutions containing as much as 50 percent by weight of the dissolved copolymer at room temperatures can easily be prepared. And, generally speaking, the cloud points of copolymers containing as much as 80 weight percent of VO—M are at least about 80° C., whereas copolymers containing 35–40 or more weight percent of the N-heterocyclic comonomer, especially VP, are free from clouding effects, even at the boil. Likewise, the copolymers usually have much better, if not complete alcohol solubility in comparison to PVO—M. Thus, in VO—M/VP copolymers the solubility in lower alkyl alcohols increases with a decreasing VO—M content until, at 60 weight percent or less VO—M in the copolymer, the alcohol solubility is generally complete.

The densities of the copolymeric products of the present invention, which are usually obtainable in the form of normally solid, amorphous (i.e., non-crystalline), free-flowing, white or light-colored, hygroscopic powders, are generally intermediate between those of the individual homopolymers of the separate comonomeric constituents. To afford illustration of this, the VO—M/VP copolymers ordinarily have densities between about 1.212 and 1.285 grams per cubic centimeter (which are the densities of poly-N-vinyl-2-pyrrolidone (PVP) and PVO—M, respectively). The dye-receptivity of all of the copolymeric products of the invention is commensurate with that of either PVP or PVO—M.

The copolymeric products can be prepared in the conventional manner by polymerization in mass (oftentimes referred to as bulk polymerization) as well as polymerization, at practically any level of concentration, in aqueous or other solution or in emulsion or other dispersion in liquids with which the particular monomers being copolymerized are not soluble or are only partially soluble. It is ordinarily beneficial for the polymerization to be conducted at a temperature between about 50° and 100° C., although this may vary with the particular catalysts used and the type of reaction being conducted. Suitable catalysts or initiators for the copolymerization include the azo catalysts, such as $\alpha,\alpha'$-azobisisobutyronitrile, peroxygen catalysts, such as potassium persulfate, benzoyl peroxide, lauroyl peroxide, hydrogen peroxide and the like, and irradiation under the influence of high energy fields. The latter catalyzation may include the various actinic radiations, including such diverse forms of catalysts as ultraviolet, X-ray and gamma radiations, as well as radiations from radioactive materials and high energy electron beams generated from linear accelerators, resonant transformers and the like. The copolymers may advantageously be prepared as high polymers having molecular weights, for example, in the range from 5 or 10 to several hundred thousand (as determinable from Fikentscher K-values of about 5–10 or more to as high as 75 to 100 or so).

As mentioned in the foregoing, the copolymer products may be employed with great benefit as dye-assisting adjuvants or dye-receptors for synthetic textile fibers and other shaped articles of normally difficult to dye synthetic polymers in which they may be incorporated, particularly those of the fiber forming acrylonitrile polymers including polyacrylonitrile. They are also very useful as dye-stripping agents for textiles and in various hair setting formulations and preparations.

The invention is further illustrated in and by the following examples, wherein all parts and percentages are to be taken by weight.

*Example I*

Into a 3 liter flask there was charged 200 grams of pure VP (M.W. 111); 200 grams of pure VO—M (M.W. 113); 4 grams of $\alpha,\alpha'$-azobisisobutyronitrile; and 2 liters of absolute ethanol. The contents of the flask were stirred constantly and heated under reflux (78° C.) for ten hours. After this time, the reaction was terminated. The resulting solution was clear, colorless and syrupy. The VO—M/VP copolymer product, which contained about 50 percent of each of the comonomers, was isolated by slowly pouring the reaction mass into about 6 liters of diethyl ether, whereupon the copolymer precipitated as a white powder having a density of about 1.250 grams per cubic centimeter (after having been dried in vacuum for purification). Its K-value was about 28.

The foregoing general procedure was duplicated several times, using varied proportions of the monomeric ingredients, to obtain VO—M/VP copolymer products containing from 1 to 99 percent of polymerized VO—M. Similar results may also be obtained when the foregoing procedure is essentially duplicated, excepting to replace the VP monomer with N-vinyl-2-piperidone, N-vinyl-2-caprolactam, N-vinyl-succinimide, N-vinyl-3-morpholinone or mixtures thereof, or wtih mixtures of all, or any, of the last mentioned monomers with VP.

*Example II*

A series of physical mixtures (or polymer blends) of PVO—M and PVP was prepared using homopolymers having K-values of about 30. When dissolved in water to obtain solutions having about 5 percent total dissolved solids and heated, the resulting solutions showed the characteristic cloud point of PVO—M at about 37° C. This is illustrated in the graph in the sole figure of the accompanying drawing by curve "A," which is plotted to describe the data obtained with the several polymer blend solutions obtained.

In contrast, a series of VO—M/VP copolymers were prepared containing varying proportions of VO—M polymerized in the polymer molecule. When the copolymer products were dissolved in water to make 5 percent solutions and heated, it was observed that the cloud point underwent a sharp rise with increasing amounts of VP in the copolymer. Thus, in a copolymer containing 10 percent VP, the cloud point was 60° C.; with 20 percent VP it was 79° C.; with 30 percent VP it was 89° C. Copolymers containing more than about 35–40 percent VP were found to have no cloud point, even at the boil. The results of these data are also graphically illustrated, by curve "B," in the accompanying drawing.

Similar results are obtained with copolymers of VO—M and N-vinyl-2-piperidone, N-vinyl-2-caprolactam, N-vinylsuccinimide, N-vinyl-3-morpholinone, or mixtures thereof with one another or VP. Similar results are also obtained when solutions of different polymer solids concentration are involved.

*Example III*

A spinning solution comprised of about 10 parts of polyacrylonitrile dissolved in about 90 parts of a 60 percent aqueous solution of zinc chloride is extruded through a spinnerette having 750 orifices, each having a diameter of about 0.006 inch, into an aqueous coagulating bath that contains about 42 percent of zinc chloride dissolved therein to be spun into a multiple filament tow. The coagulated tow is washed substantially free from salt after being withdrawn from the coagulating bath and collected. There is thereby obtained an aquagel fiber containing about 2 parts of water for each part of polymer therein.

About 1.5 parts of the aquagel (on a wet weight basis) is immersed for about 20 minutes in an aqueous solution of about 3 percent of a VO—M/VP copolymer containing about equal parts by weight of each in the polymer molecule. The applicating solution is maintained at about 90° C. during the impregnation without experiencing any occurence of polymer clouding. The copolymer employed has a Fikentscher K-value of about 30 and is prepared as set forth in the first example. After being impregnated, the polyacrylonitrile fiber is removed from the impregnating bath and dried for 15 minutes at about 150° C. Its dye-receptivity when dyed in the conventional manner with 4 percent Calcodur Pink 2BL (C.I. 353) is found to be excellent, with the copolymer-containing fiber accepting the dyestuff to deep and level shades of coloration. Commensurate results are obtained when the adjuvant consists of any other of the VO—M copolymers of the invention.

What is claimed is:

1. A normally solid copolymer consisting essentially of between about 1 and 99 weight percent, based on the weight of the copolymer, of copolymerized N-vinyl-5-methyl-2-oxazolidinone with from about 99 and 1 weight percent, based on the weight of the copolymer, of a copolymerized monomer selected from the group consisting of N-vinyl-2-pyrrolidone, N-vinyl-2-piperidone, N-vinyl-2-caprolactam, N-vinyl-succinimide, N-vinyl-3-morpholinone, and their mixtures.

2. The copolymer of claim 1, containing from about 10 to 90 weight percent of said N-vinyl-5-methyl-2-oxazolidinone.

3. A copolymer of N-vinyl-5-methyl-2-oxazolidinone and N-vinyl-2-pyrrolidone according to claim 1.

4. The copolymer of claim 3, containing from about 60 to 80 weight percent of said N-vinyl-5-methyl-2-oxazolidinone.

5. The copolymer of claim 3, containing from about 40 to 99 weight percent of said N-vinyl-5-methyl-2-oxazolidinone.

6. The copolymer of claim 1 having a Fikentscher K-value between about 5 and 100.

References Cited in the file of this patent

UNITED STATES PATENTS 2,818,362    Drechsel _____ Dec. 31, 1957